(12) United States Patent
Takahashi

(10) Patent No.: US 6,793,810 B1
(45) Date of Patent: Sep. 21, 2004

(54) WASTE WATER TREATMENT APPARATUS

(75) Inventor: Toshihiro Takahashi, Tokyo (JP)

(73) Assignee: Aoki Electric Ind. Co., Ltd., Tokyo (JP)

( * ) Notice: Subject to any disclaimer, the term of this patent is extended or adjusted under 35 U.S.C. 154(b) by 51 days.

(21) Appl. No.: 10/148,080

(22) PCT Filed: Sep. 29, 2000

(86) PCT No.: PCT/JP00/06801

§ 371 (c)(1),
(2), (4) Date: May 28, 2002

(87) PCT Pub. No.: WO02/28784

PCT Pub. Date: Apr. 11, 2002

(51) Int. Cl.[7] .................................................. C02F 3/06
(52) U.S. Cl. ....................................... 210/150; 210/194
(58) Field of Search ................................ 210/150, 151, 210/194, 195.1, 196, 617, 621, 622, 629

(56) References Cited

U.S. PATENT DOCUMENTS

| | | | |
|---|---|---|---|
| 3,133,017 A | * | 5/1964 | Lambeth ..................... 210/629 |
| 4,137,171 A | * | 1/1979 | Yokata ........................ 210/150 |
| 4,810,377 A | * | 3/1989 | Kato et al. ................... 210/150 |
| 4,925,552 A | * | 5/1990 | Bateson et al. .............. 210/150 |
| 4,999,103 A | * | 3/1991 | Bogart ........................ 210/151 |
| 5,795,480 A | * | 8/1998 | Keun et al. .................. 210/151 |

FOREIGN PATENT DOCUMENTS

| | | |
|---|---|---|
| JP | 62-74489 | 7/1987 |
| JP | 63-35500 | 3/1988 |
| JP | 2-75112 | 6/1990 |
| JP | 4-87797 | 7/1992 |
| JP | 5-10999 | 2/1993 |
| JP | 7-328673 | 12/1995 |
| JP | 9-327697 | 12/1997 |
| JP | 10-180275 | 7/1998 |
| JP | 10-249367 | 9/1998 |
| JP | 11-169897 | 6/1999 |

* cited by examiner

*Primary Examiner*—Christopher Upton
(74) *Attorney, Agent, or Firm*—Clark & Brody

(57) ABSTRACT

A waste water treatment apparatus has a reactor 12 in which humus-containing pellets are packed, and a water storage tank 4 in which the reactor 12 is installed. The reactor 12 is installed in plurality in the water storage tank 4, and any of a plural of the reactor 12 and pellet-packed structure 27 attached to the respective reactor 12 is adapted to be removable from the water storage tank 4.

5 Claims, 6 Drawing Sheets

WASTE WATER TREATMENT APPARATUS

TECHNICAL FIELD

This invention relates to a waste water treatment apparatus for purifying soil water, such as waste water and sewage water discharged from agricultural facilities, by utilizing soil bacteria.

BACKGROUND ART

Techniques whereby waste water or the like from agricultural facilities is purified by the action of soil bacterial are known in the art. Japanese Patent Application No. 1993-10999B discloses the utilization of humus for cultivation and activation of such soil bacterial and the technique the humus is formed into pellets and these pellets are brought into contact with waste water under the aerobic condition in a water storage tank to obtain seed sludge. The equipment in which those pellets are packed is in some cases called a reactor by those skilled in the art. The reactor may be in other cases used to mean a combination of such a reactor and the water storage tank. However, the reactor, as used in the present invention, refers to the latter, i.e., the equipment in which those pellets are packed.

The above-described prior art employs one reactor for one water storage tank. The number of pellets packed in each water storage tank is increased in an approximate proportion to the treatment capacity of the water storage tank. For example, if the water storage tank has a waste water treatment capacity of 10,000 m$^3$/day, approximately 1,200 kg of pellets are packed in the reactor. If the water storage tank has a waste water treatment capacity of 20,000 m$^3$/day, approximately 2,400 kg of pellets are packed in the reactor. Notwithstanding the above, it has come within the knowledge of the inventors of this application that the amount of the pellets packed in an approximate proportion to the treating capacity of the water storage tank, if exceeds about 1,000 kg, retards a flow of the waste water and causes insufficiency of air supply in a central section of a pellet container to thereby hinder effective utilization of the pellets located in the central part of the pellet container. Also, the increased amount of the packed pellets leads inevitably to an increase in the size of the reactor. This requires the use of a large-sized machine in replenishing fresh pellets to or replacing the old pellets in the reactor, resulting in increasing cost for maintaining the waste water treatment apparatus.

It is accordingly an object of this invention to provide a waste water treatment apparatus which permits effective use of pellets that leads not only to the reduction in amount of the pellets needed for one water storage tank but also to the hold-down of the cost increase in maintaining the waste water treatment apparatus. The packing of the pellets, as described in the present invention, encompasses not only the case wherein the pellets are fully packed in the container or apparatus, but also the case wherein the pellets are packed in the container or apparatus to the extent that leaves a substantial volume of open spaces therein.

DISCLOSURE OF THE INVENTION

According to the present invention, there is provided a waste water treatment apparatus, which includes a water storage tank incorporated in a treatment process of organic waste water and a reactor disposed within the water storage tank. The apparatus is constructed such that the waste water in the water storage tank can be brought into contact with humus-containing pellets packed in the reactor under an aerobic condition so that soil bacteria is cultured in the waste water.

The water storage tank is provided with an inlet for receiving the waste water and an outlet where the waste water leaves the tank. A plurality of the reactors are disposed between the inlet and the outlet. Any of the reactors and containers attached to the reactors for packing the pellets therein is adapted to be removable from the water storage tank.

BEST MODE FOR CARRYING OUT THE INVENTION

The waste water treatment apparatus in accordance with this invention is described below in detail with reference to the attached drawings.

Figure 1:
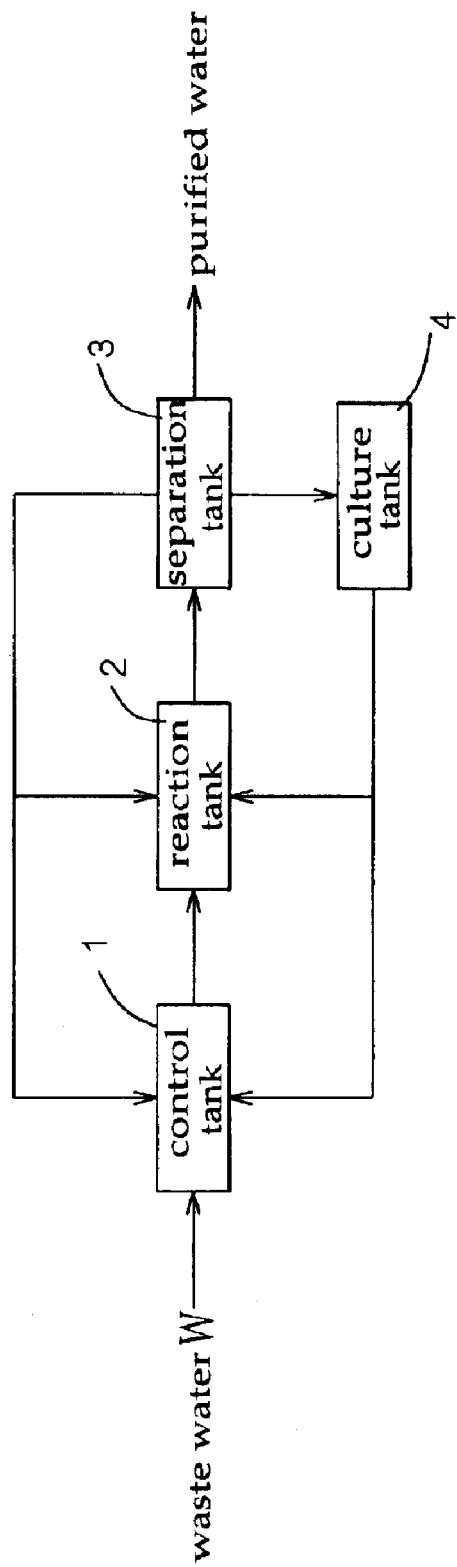
FIG. 1 is a process flow block diagram which depicts exemplary process steps of waste water treatment.

FIG. 1 is a view illustrating an exemplary waste water treatment process whereby waste water W, such as waste water or sewage water from agricultural facilities, is purified by the action of soil bacteria. In FIG. 1, the waste water treatment apparatus includes a culture tank (a water storage tank) 4 and a plurality of reactor 12 (refer to FIG. 2) disposed within the culture tank 4. In this Figure, the waste water W is introduced to a control tank 1 where sludge containing a large amount of soil bacteria is mixed with the waste water in a ratio that is suitably chosen depending upon the qualities of the waste water. The mixture is allowed to advance to a reaction tank 2 where the waste water is subjected to the action of soil bacteria either under an aerobic condition or under the aerobic and subsequent anaerobic condition so that its purification progresses. In a separation tank 3, the waste water W is separated into a purified water and a waste water containing a large amount of sludge. The purified water is taken out from the process as treated water for effective utilization, while the sludge is in part delivered to the culture tank 4, together with the waste water W, and in part returned to the control tank 1 and the reaction tank 2.

Figure 2:
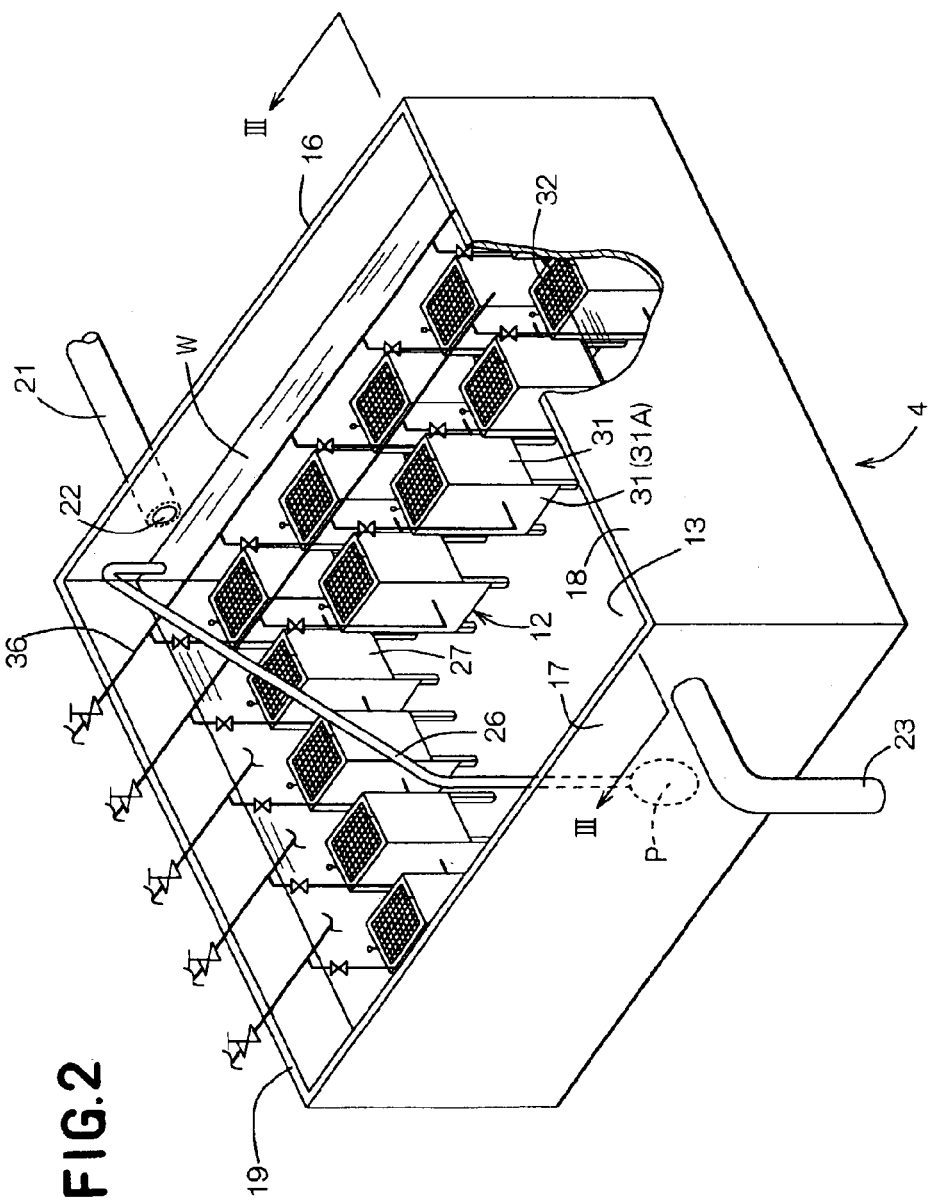
FIG. 2 is a perspective view of a water storage tank (culture tank)
Figure 3:
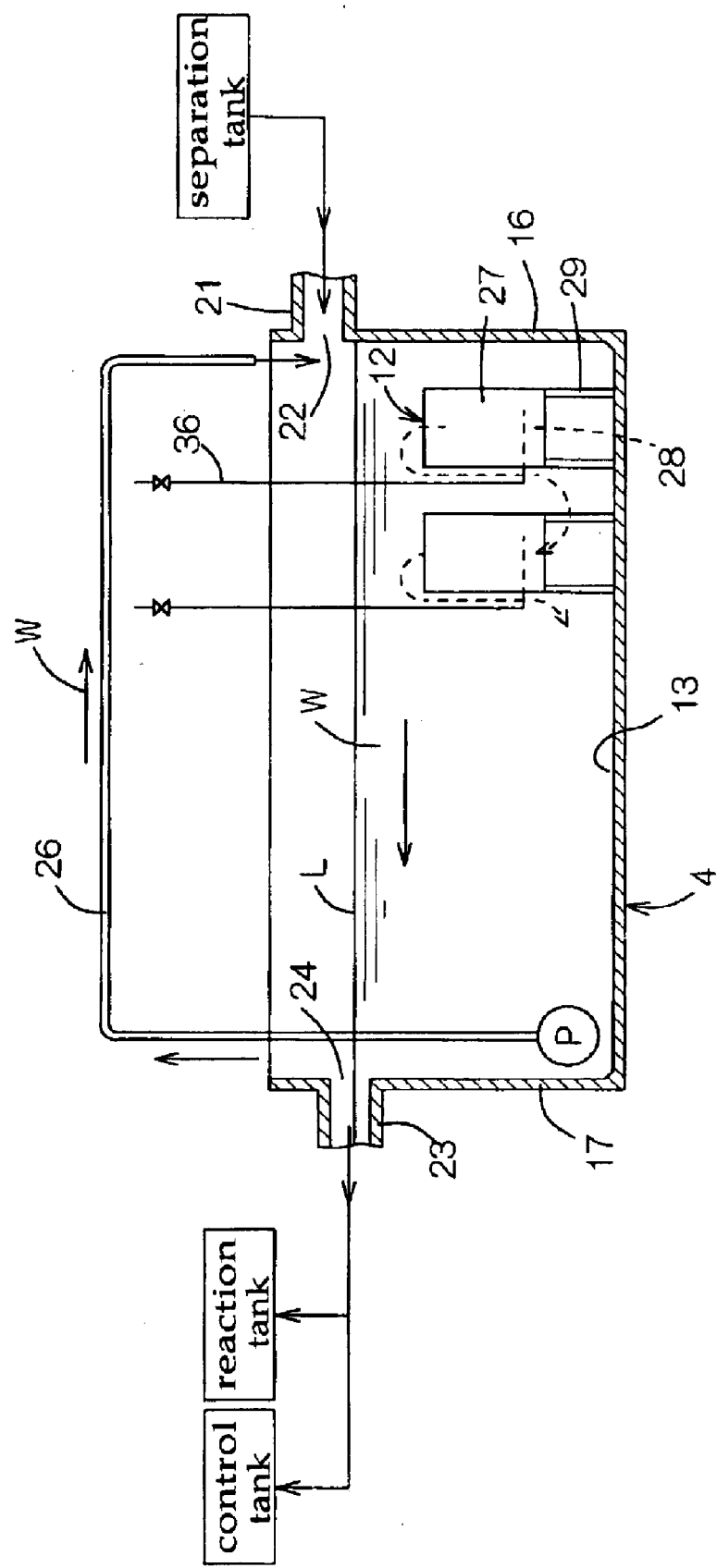
FIG. 3 is a sectional view taken along the line III—III of FIG. 2.
Figure 4:
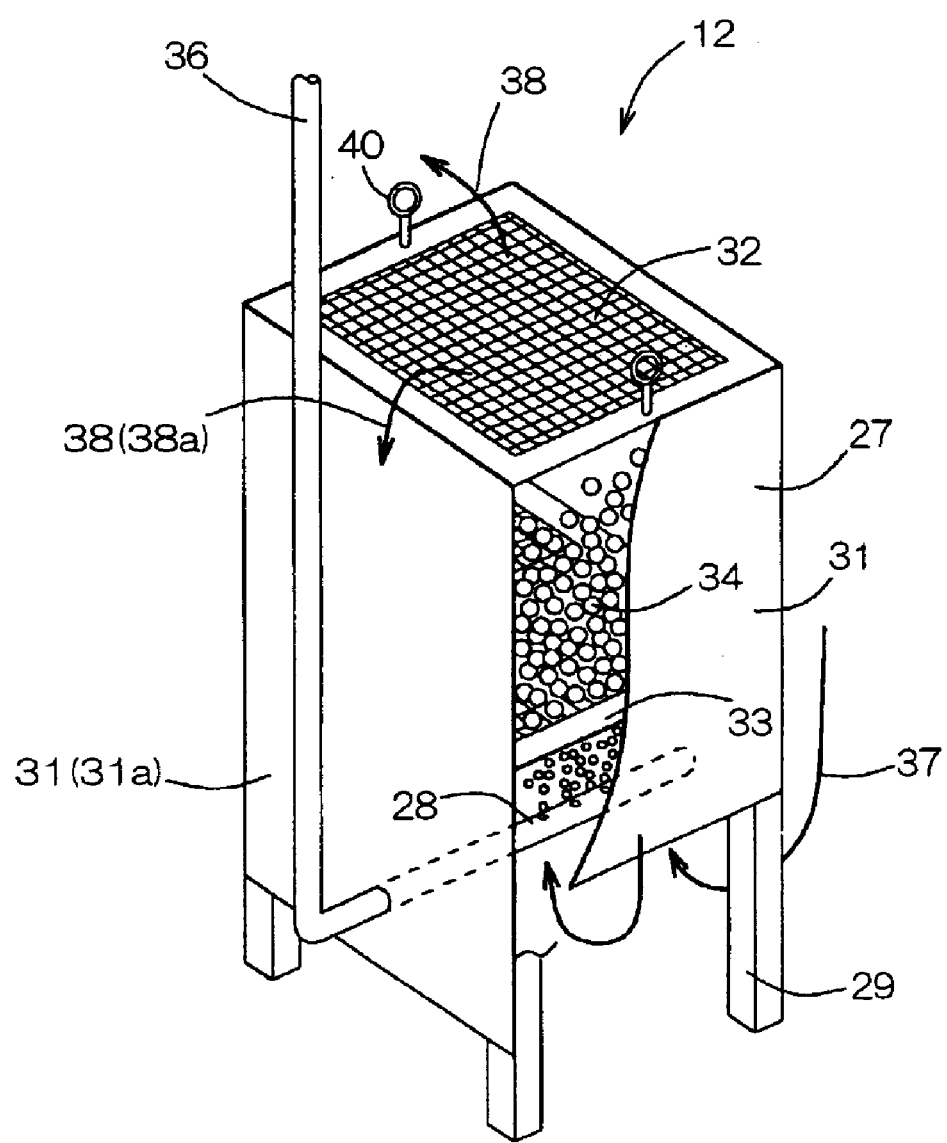
FIG. 4 is a partially cut-away perspective view of a reactor.

FIGS. 2, 3 and 4 are a perspective view of the culture tank 4, FIG. 3 is a view taken along the line III—III of FIG. 2 and FIG. 4 is a partially cut-away perspective view of the reactor 12. A number of reactor 12 are placed within the culture tank 4. The illustrated culture tank 4 has a waste water treatment capacity of 20,000 m$^3$/day and includes a concrete bottom wall 13, first and second side walls 16, 17 opposing to each other, and third and fourth side walls 18, 19 opposing to each other. A water supply pipe 21 extending from the separation tank 3 is connected to an inlet 22 on the first side wall 16. Another water delivery pipe 23 extending outwardly from the culture tank 4 is connected to an outlet 24 on the second side wall 17. The inlet 22 is located at a position slightly higher than the outlet 24. This difference in elevation allows the waste water W in the culture tank 4 to flow from the inlet 22 toward the outlet 24. As the waste water W reaches the location adjacent the second side wall 17, a part thereof is caused to pass through a water delivery pipe 26 by the action of a feedback pump P, if operated, and return to the location adjacent the outlet 22.

A plurality of the reactor 12 are arranged in rows both in the direction x along which the first sidewall 16 faces toward the second side wall 17 of the culture tank 4 and in the direction y transverse to the direction x. Five units of reactor 12 are arranged in each row and accordingly 25 reactors, in total, are used to treat 20,000 $m^3$ of waste water per day. Each of shown reactor 12 includes a pellet-packed structure 27 configured in a vertically-elongated rectangular shape, an air diffuser pipe 28 located underneath the pellet-packed structure 27, and four supporting legs 29. They are placed on the bottom wall 13 of the culture tank 4 and can be removed from the culture tank 4 by using a small-sized crane. The structure 27 is surrounded by four side walls 31 and has top and bottom mesh plates 32, 33 which is packed with about 45 kg of pellets 34. The air diffuser pipe 28 is connected to an air piping 36 that extends from an upper portion of the culture tank 4 and produces a number of streams with bubbles directed toward the bottom mesh plate 33. These bubble streams create an upward flow of the waste water W within the reactor 12 and also keep the pellet-packed structure 27 under the aerobic condition. By the action of the upward flow, the waste water W is invited to pass through between the supporting legs 29 along the arrow 37, enter the reactor 12, flow toward the bottom mesh plate 33, enter the pellet-packed structure 27, exit from the top mesh plate 32 and further flow along the arrow 38 toward the neighboring reactor 12. Among the peripheral walls 31$a$ of the reactor 12, the peripheral wall 31$a$ located adjacent the outlet 24 is preferably configured to extend closer to the bottom wall 13 of the culture tank 4 compared to the other peripheral walls 31. Due to the presence of such-configured peripheral wall 31$a$, a flow 38$a$ which branches from the flow of waste water w exiting from the top mesh plate 32 and flows toward the outlet 24 is prevented from being redirected toward the bottom mesh plate 33 of the reactor 12 but guided to flow toward the other reactor 12 located closer to the outlet 24. The pellets 34 are prepared by forming humus or its mixture with inorganic material, such as andesite or pumice, into granules. Those known or well-known in the art may be used. Also, up to 80 weight % of a total amount of the pellets 34 packed in the structure 27 can be replaced by pumice or other inorganic granules. The weight of the pellets 34, as used in this invention, means a total weight of the humus-containing granules and inorganic granules. The mixed presence of these granules is effective to culture and activate soil bacteria.

In the waste water treatment apparatus of this invention which includes such culture tank 4 and a plurality of the reactor 12, the waste water W entering from the inlet 22 of the culture tank 4 is allowed to pass through several units of the reactor 12 where it contacts with the pellets under an aerobic condition, and then advances gradually to the outlet 24. While the waste water W resides in the culture tank 4, the soil bacteria effective to purify the waste water w is cultured or activated. The waste water W containing a large amount of such soil bacteria is in part allowed to exit from the outlet 24 as seed sludge which is subsequently supplied to the control tank 1 or the reaction tank 2. In the operation of the apparatus in accordance with this invention, a part of the waste water W may be brought in the water delivery pipe 26 by a pump P and returned to the vicinity of the inlet 22, if necessary. The returned waste water W is then allowed to repeat contacting with the pellets 34 in the reactor 12. After a long-term of operation during which a majority of the pellets is exhausted, the reactor 12 may be removed outside the culture tank 4 by means of a small-sized crane. Then, fresh pellets 34 are replenished. Alternatively, those granular pellets 34 which are reduced in size by exhaustion are replaced by fresh pellets 34. Eyebolts 40 (refer to FIG. 4) attached to each reactor 12 may be utilized when the reactor 12 is removed out by the crane.

This invention is particularly effective when practiced with the culture tank 4 having a waste water treatment capacity of not smaller than 5,000 $m^3$/day. In this invention, if a waste water treatment capacity of such a culture tank 4 is given by t, the number n of the reactor 12 required to be installed in the culture tank 4 can be calculated from the following equation (1)

$$n=(t+5)\times(1\pm0.4) \tag{1}$$

For example, the number n of the reactor 12 required to be installed in the culture tank 4 with a treatment capacity of 20×1,000 $m^3$/day is calculated as follows:

$$n=(20+5)\times(0.6-1.4)=15-35$$

Preferably, 15–35 units of the reactor 12 are installed. In the illustrated exemplary culture tank 4, 25 units of the reactor 12 are installed.

Also, the total weight r (unit in 1,000 kg) of the pellets 34 used for n units of the reactor 12, based on the waste water treatment capacity t of the culture tank 4, can be calculated from the following equation (2):

$$r=(1.5t/30+0.5)\times(1\pm0.4) \tag{2}$$

The amount s (unit in 1,000 kg) of the pellets packed in each reactor 12 can be calculated from the following equation (3):

$$s=r/n \tag{3}$$

In the shown exemplary culture tank 4 having a waste water treatment capacity of 20×1,000 $m^3$/day, 25 units of the reactor 12 are employed. Accordingly, the total weight r of the pellets 34 and the amount s of the pellets 34 packed in each reactor 12 are as follows:

r=(1.5/30×20+0.5)×(0.6–1.4)=1.5×(0.6–1.4)=0.9–2.1 (unit in 1,000 kg); and s=1.125/25=0.045 (unit in 1,000 kg), if the total weight r is given by 1.533 0.75=1.125 (unit in 1,000 kg).

Figure 5A:
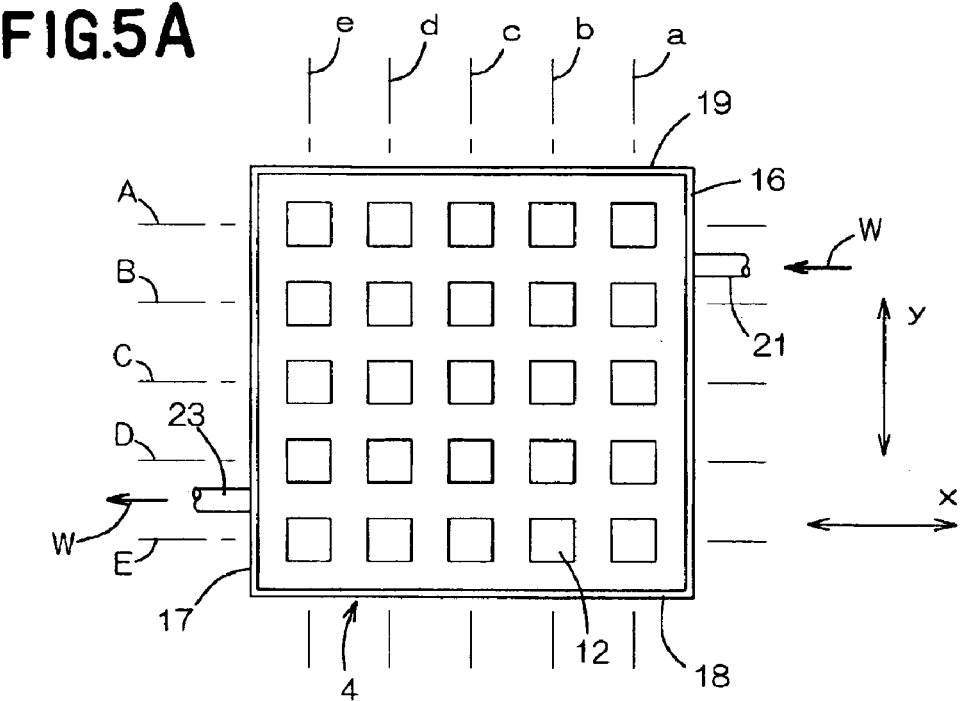
FIGS. 5A and 5B are plan views illustrating culture tank embodiments.
Figure 5B:
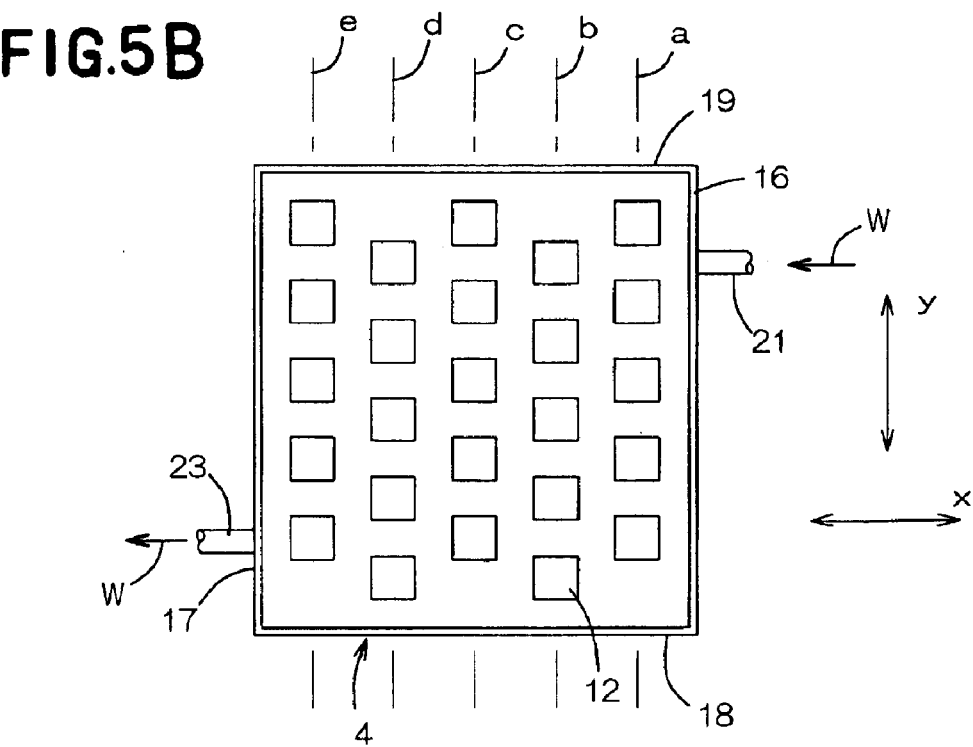

FIG. 5 is a plan view which shows one exemplary arrangement of the reactor 12. In this Figure, the water delivery pipe 26 and the air piping 36 are not shown. FIG. 5A is a plan view of the culture tank 4 shown in FIG. 2. FIG. 5B is a plan view showing another embodiment of this invention. As shown in FIG. 5A, the culture tank 4 when viewed in a plane has a rectangular shape having a pair of parallel sides extending in the x direction and another pair of parallel sides extending in the y direction normal to the x direction. Each of the reactor 12 is arranged at regular intervals both in the x and y directions to define rows A, B, C, . . . extending in the x direction and rows a, b, c, . . . extending in the y direction. In FIG. 5B, a plurality of the reactor 12 are arranged at regular intervals both in the x and y directions. However, the row b of reactor 12 is staggered by a half of the regular interval in the y direction from the row a of reactor 12. With such an arrangement of the reactor 12, the waste water W is allowed to contact the pellets 34 in the reactor 12 in the row b after it has passed between the neighboring reactors 12 in the row a. A plurality of the reactor 12 in the row c or e are aligned in the x direction with those in the row a. A plurality of the reactor 12 in the row d are aligned in the x direction with those in the row b.

Figure 6A:
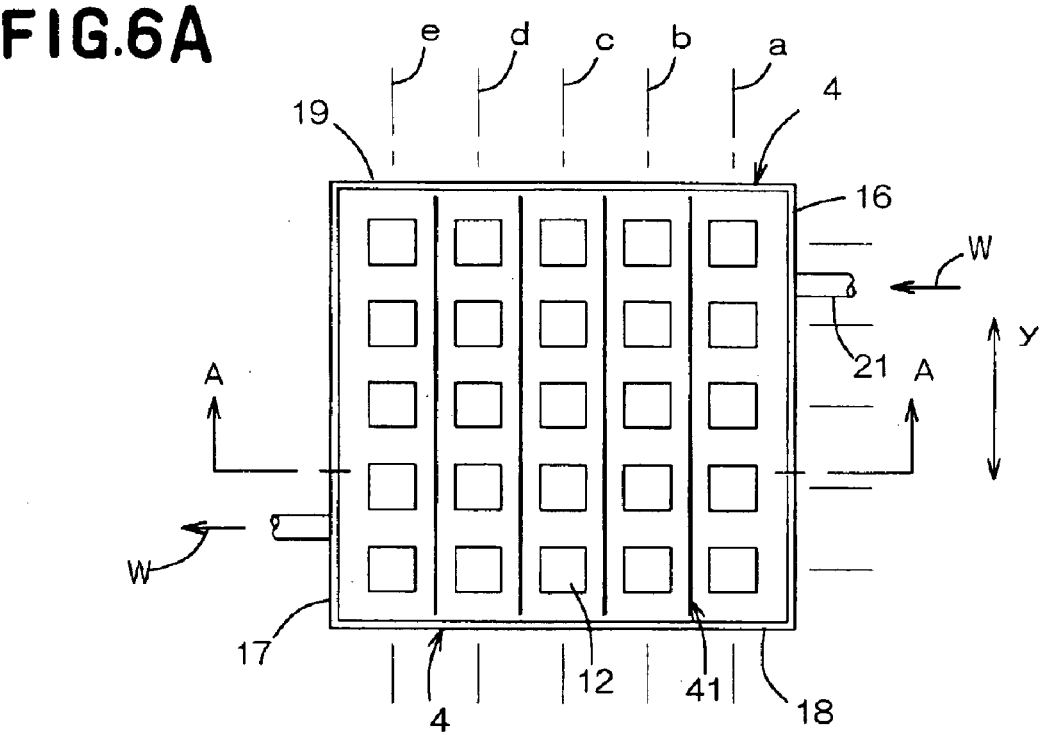
FIG. 6A is a view similar to FIG. 5A for illustrating another culture tank embodiment and FIG. 6B is a sectional view taken along the line A—A of FIG. 6A.
Figure 6B:
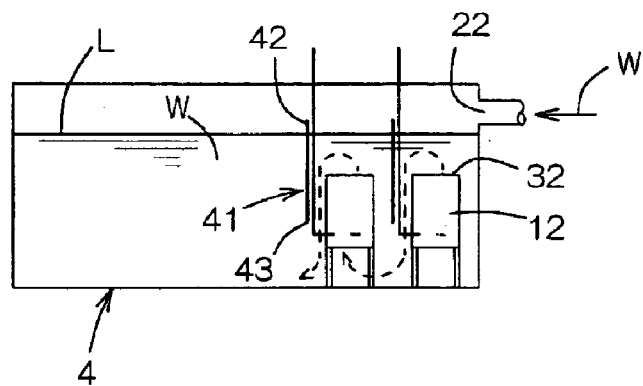

FIG. 6A is similar to FIG. 5A, showing a further embodiment of this invention. FIG. 6B is a sectional view taken along the line A—A of FIG. 6A. In the shown waste water treatment apparatus, a flow regulator plate 41 is provided between the neighboring rows a, b, c, . . . for regulating a direction of flow of the waste water W. A top end 42 of the regulator plate 41 is located above the top mesh plate 32 of the reactor 12, preferably above a surface level L of the waste water. A bottom end 43 of the flow regulator plate 41 is located above the bottom wall 13 of the culture tank 4. The presence of such regulator plates 41 prevents the flow whereby the waste water W enters the inlet 22, passes over the reactor 12 and exits freely from the outlet 24, and permits the waste water W exiting from the top mesh plate 32 to flow downward along the flow regulator plate 41 and enters the adjacent reactor 12, as shown by a dotted arrow in FIG. 6B. Such construction increases the chance of the waste water W to contact the pellets 34, so that culture and activation of soil bacteria can be accelerated. The flow regulator plate 41 can be attached to the culture tank 4 or the reactor 12. While the flow regulator plate 41 is shown to be continuous in the y direction, it may be divided into sections and attached to the respective reactor 12, one for each.

In this invention, the reactor 12 may be constructed such that not its entirety but the pellet-packed structure 27 alone is removed from the culture tank 4. No limitation is imposed on the shape of the pellet-packed structure 27. The illustrated exemplary structure may be replaced by a cylindrical structure. Preferably, a plurality of the reactor 12 are arranged in rows in at least one of the x and y directions. The arrangement of the reactor 12 in parallel rows facilitates installment thereof in the tank 4 and eases operation of removal thereof from the tank 4. However, this is not intended to exclude the arrangement whereby the reactor 12 is placed in such optional location that secures better contact of the waste water W with the pellets 34.

In the waste water treatment apparatus in accordance with this invention, a plurality of reactor are placed within the culture tank and humus pellets are distributed in each reactor. As contrary to the prior art, these increase the chance of the waste water to be contacted with air and thus eliminate the necessity of increasing the amount of the pellets used in proportion to the amount of the waste water to be treated. The use of such plural reactors permits size reduction of each reactor. This facilitates inspection of the reactors as well as operations of replenishing fresh pellets and replacing old pellets.

What is claimed is:

1. A waste water treatment apparatus comprising:

a water storage tank incorporated in a treatment process of organic waste water;

a plurality of reactors disposed within the water storage tank and which are constructed such that the waste water in the water storage tank can be brought into contact with humus-containing pellets packed in the reactors under an aerobic condition so that soil bacteria is cultured in the waste water; wherein the water storage tank is provided with an inlet for receiving the waste water and an outlet where the waste water leaves the tank, and each reactor comprising a pellet-packed structure, and air diffuser, and supporting legs, and being placed in the tank between the inlet and the outlet, in an array comprising a plurality of rows of said reactors, being adapted to be removable from the water storage tank.

2. The waste water treatment apparatus as recited in claim 1, wherein said water storage tank further includes a flow regulator plate for regulating a direction of flow of the waste water.

3. The waste water treatment apparatus as recited in claim 1, wherein said water storage tank has a waste water treatment capacity of not smaller than 5,000 m$^3$/day, and the number n of said reactors installed in the water storage tank is related to the waste water treatment capacity t (unit in 1,000 m$^3$/day) of the water storage tank by the following equation:

$$n=(t+5)\times(1\pm0.4).$$

4. The waste water treatment apparatus as recited in claim 1, wherein said water storage tank has a waste water treatment capacity of not smaller than 5,000 m$^3$/day, and the total weight r (unit in 1,000 kg) of said pellets used for the water storage tank is related to the waste water treatment capacity t (unit in 1,000 m$^3$/day) of the water storage tank by the following equation:

$$r=(1.5t/30 +0.5)\times(1\pm0.4).$$

5. The waste water treatment apparatus as recited in claim 1, wherein said water storage tank has a water delivery system attached thereto for returning a part of the waste water from a location adjacent said outlet toward a location adjacent said inlet.

* * * * *